(12) United States Patent
Maierholzner

(10) Patent No.: US 6,890,012 B2
(45) Date of Patent: May 10, 2005

(54) FOLDABLE COVER SUPPORTED ON A BEARING

(75) Inventor: Thomas Maierholzner, Vilsbiburg (DE)

(73) Assignee: Seeber AG & Co. KG, Mannheim (DE)

( * ) Notice: Subject to any disclaimer, the term of this patent is extended or adjusted under 35 U.S.C. 154(b) by 0 days.

(21) Appl. No.: 10/725,203

(22) Filed: Dec. 1, 2003

(65) Prior Publication Data

US 2004/0245796 A1 Dec. 9, 2004

(30) Foreign Application Priority Data

Jun. 6, 2003 (DE) ..................................... 203 08 994 U

(51) Int. Cl.$^7$ ............................................. B60R 27/00
(52) U.S. Cl. ................... 296/24.34; 296/37.8; 296/1.07
(58) Field of Search ............................. 296/24.34, 37.8, 296/1.09, 37.5

(56) References Cited

U.S. PATENT DOCUMENTS

| | | | | |
|---|---|---|---|---|
| 4,818,008 | A | * 4/1989 | Cressoni | .................... 296/37.8 |
| 6,129,237 | A | 10/2000 | Miyahara | |
| 6,497,443 | B2 | * 12/2002 | Worrell et al. | ............. 296/37.8 |
| 6,663,155 | B1 | * 12/2003 | Malone et al. | ............. 296/37.8 |
| 6,719,343 | B2 | * 4/2004 | Emerling et al. | .......... 296/37.8 |
| 2002/0140632 | A1 | * 10/2002 | Shah | ............................. 345/5 |

* cited by examiner

Primary Examiner—Jason Morrow
(74) Attorney, Agent, or Firm—Herbert Dubno

(57) ABSTRACT

A cover is supported on a bearing, in particular, for an armrest, in particular for a center arm rest of a motor vehicle. The cover is characterized in that the cover includes at least a first cover part, with which a data output unit or a data input unit is moveably connected.

9 Claims, 4 Drawing Sheets

FOLDABLE COVER SUPPORTED ON A BEARING

CROSS REFERENCE TO RELATED APPLICATIONS

This application relates to German Utility Model Application 203 08994.4 filed 6 Jun. 2003 under 35 USC 119 and the International Convention.

FIELD OF THE INVENTION

The invention relates to a cover supported on a bearing, in particular, for an arm rest of a motor vehicle.

BACKGROUND OF THE INVENTION

From German patent document 198 24 248 filed 29 May 1998 by C. Lange et al., a covering or a cover with a plurality of surface elements that are displaceably guided in a guide is known, which can be brought from a closed into an open position. This covering can be used, for example, to cover a center console between the two front seats of a passenger vehicle.

From U.S. Pat. No. 6,129,237 filed 16 Nov. 1998 by Miyahara, a two-part cover is known, in which a first cover part is connected with a bearing via a first pivot shaft. On the first cover part, a second cover part is connected via a second pivot shaft. In addition, the second cover part is guided via guide rails into the bearing part.

OBJECT OF THE INVENTION

It is an object of the present invention to produce a cover, which has a broadened functionality relative to known covers or coverings.

SUMMARY OF THE INVENTION

According to the present invention, this object is solved with a cover of the above-described type, in which the cover includes at least one cover part, with which a data output unit and/or a data input unit is moveably connected.

As a "cover" in the sense of this application, also all types of fixed and immovable coverings are to be understood, on which a data input and/or output unit is moveably mounted.

In particular, such a cover has the advantage that it can be inserted on a center console of a passenger vehicle. When the cover additionally is formed to be folded-away or folded, the data input and/or data output unit can be brought into a plurality of positions.

Advantageous further embodiments of the invention are provided in the dependent claims and from the description.

A cover is advantageous, in which the first cover part is pivotably supported, relative to the bearing, via a first pivot shaft.

Preferably, the cover includes a second cover part, which is joined with its first end via a second pivot shaft to the first cover part and can be folded away together with the first cover part at least until formation of an acute angle between the first and second cover part.

In a further preferred form of the invention, the data output unit and/or the data input unit is connected via a first swivel joint or a hinge shaft or pivot shaft with the first cover part or with the second cover part. In this manner, an additional flexibility with the use of a display screen or monitor is achieved.

Another form of the invention is advantageous, in which the data output unit and/or the data input unit is moveable over the first swivel joint in the same pivoting plane as the first cover part.

Preferably, the cover has a second swivel joint, via which the data output unit and/or the data input unit is moveable on the first cover part in a further pivot plane.

For increasing the flexibility, in another embodiment of the invention, the first cover part includes an intermediate piece, which is pivotably arranged about the second pivot shaft. In this case, advantageously, the data input unit and/or the data output unit is connected with the intermediate piece.

Furthermore, it is preferably provided that the data input unit and/or the output unit is connected via a swivel joint with the intermediate piece and is moveable by means of the swivel joint in the further pivoting plane.

When the data input and/or data output unit that is moveably connected with the cover includes a display screen or a display, the possibility is offered, in particular, for rear passengers in the passenger vehicle, for watching pictures and films. Since the data input unit and/or the output unit can be adjusted by means of the second swivel joint also about the perpendicular or approximately perpendicular axis, the data input and/or output unit also can move in a position, from which a vehicle occupant in the front row of the vehicle can be shown data, in particular, images, such as, for example, city map or road map.

Basically, the invention can be used not only for center consoles or center armrests, but also for the armrests facing the outer walls of the vehicle. Likewise, the vehicle also can have multiple seating rows arranged behind one another.

Likewise, the invention relates in one advantageous embodiment to a cover, in which the data input unit and/or the output unit, in the folded-away state, faces toward a bearing of the first cover part with its side having a display screen or a display or with its side having control elements. In this manner, head injuries to vehicle occupants in the event of an accident by the display screen are avoided. A further advantage is that the display screen or the display is protected from damage and contamination. It is to be understood that the display screen, however, also can be arranged on the side facing away from the bearing and facing toward the user on the cover part. This embodiment, then, is particularly suited when, based on sufficiently greater distances between the display screen and the vehicle occupants, a risk of injury by the display screen can be excluded anyway.

When the data input and/or output unit is arranged on a folded-together cover, this has the advantage that by the separation of the cover into two cover parts and by means of the hinge arranged between the cover parts, the spatial length of the cover in the opened state, that is, the upwardly folded state of the first cover part, is halved, since the second cover part is folded together with the first cover part, whereby the cover is folded. In addition, in the upwardly folded-together position of the cover, a good accessibility to the data input and/or data output unit, in particular, for the rear passengers, is possible; above, all, the display screen is found in the eye height of the rear passengers.

As far as the upwardly folded-together cover and projecting display screen within a passenger vehicle being an interference or restricting visibility, it can be folded out upwardly by means of the swivel joint also from the closed cover.

Of particular advantage is a stop or latching mechanism for holding the cover in an opened state. In particular, a latching mechanism is suitable, which closes the cover according to the so-called Push-Push principle. In this regard, for example, a pin cooperating with a heart-shaped curve and attached to the carriage is suitable, through which the first and the second cover part are stopped in the folded-together position, when the user displaces the front cover part against the spring force rearwards, until the folded-together position of the cover is achieved. By repeated pressure on the front wall of the first cover part or on the top side of the first cover part, then, the cover is returned again into the position, in which the covers folded on one another form an essentially flat surface. In this manner, an automatic closing process is achieved.

In order to enable an agreeable serve of the cover, preferably a mechanism for deceleration of the pivoting movement, in particular, a silicon brake, is applied on the swivel joint. This mechanism, then, can be used above all when the cover returns from the folded-together position into the folded-away from one another, level base position.

When according to an embodiment of the invention, the cover parts have a connected covering or skin in the region of the first hinge on its top side, in the folded-away state of the cover, the effect of an individual, connected component is determined, whereby the value of the cover is increased.

BRIEF DESCRIPTION OF THE DRAWINGS

The above an other objects, features, and advantages will become more readily apparent from the following description, reference being made to the accompanying drawing in which.

SPECIFIC DESCRIPTION

Figure 1:
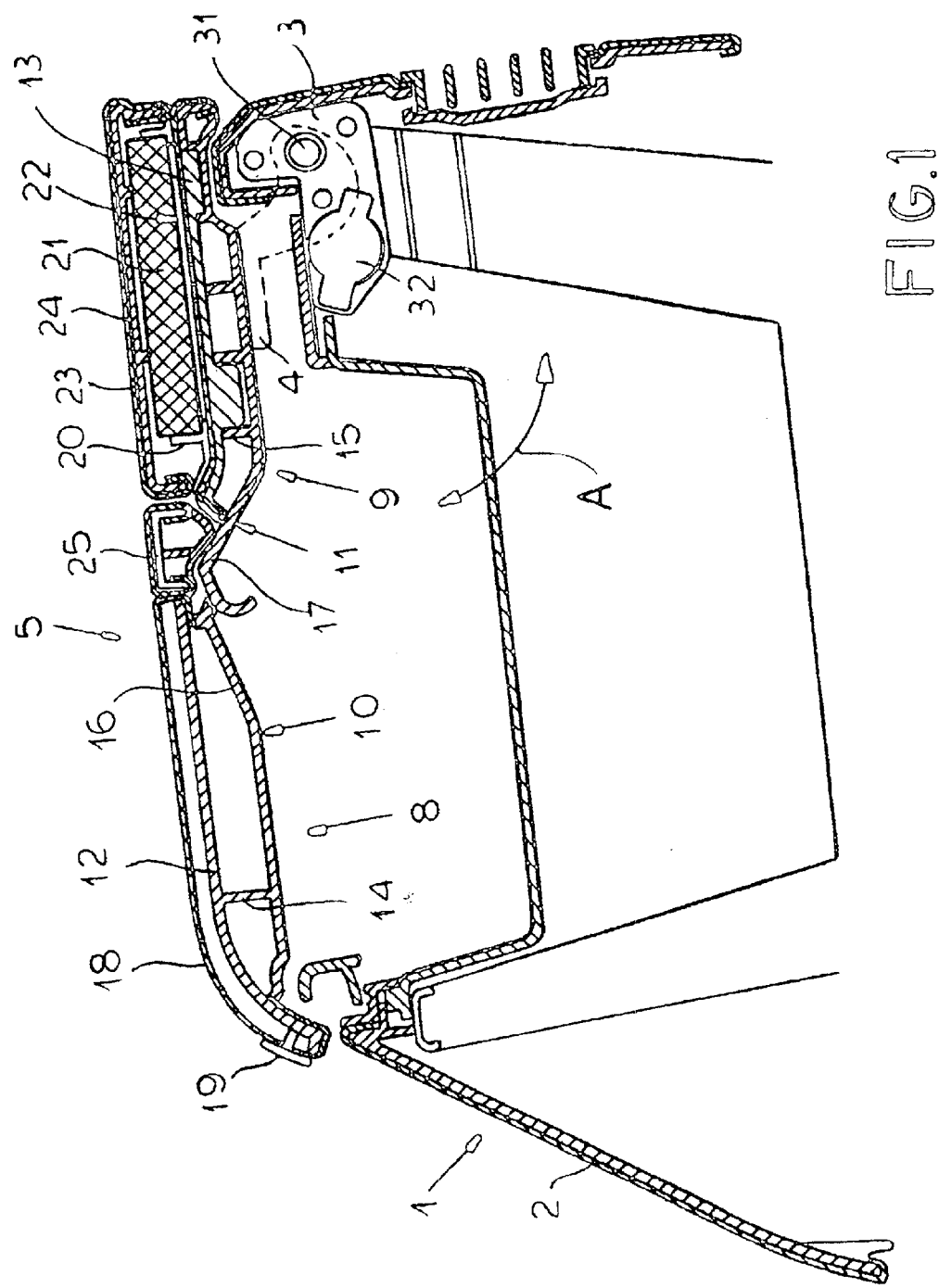
FIG. 1 shows a longitudinal section of a bearing and cover joined to this via a swivel joint with a first and a second cover part in the state of being folded away from one another with a display screen in the folded state.

A center console 1 (FIG. 1) of a motor vehicle has a bearing 2. On this, a cover 5 is pivotably supported in the direction of a double arrow A via a first pivot shaft or hinge shaft 31 and a hinge arm 4 supported in a swivel joint or a hinge receptacle 3.

The cover 5 comprises two cover parts 8, 9. Both cover parts 8, 9 include, respectively, an underside bearing part 10 or 11 with bearings 12, 13, which are connected via a structure with ribs 14, 15 with respective underside coverings 16, 17. On the bearing 12 of the cover part 8, a top-side covering 18 is applied. On this, a front side, actuation surface 19 is provided; by the operating pressure of the user on the actuation surface 19, against the spring force, a pressure spring acting on the pivot shaft 31, the cover 5 is displaced rearwards in the direction of the swivel joint 3, whereby the cover parts 8 and 9 simultaneously move upwardly in a region of a pivot or hinge shaft 26 (FIG. 2) connecting them.

On the cover part 9, a monitor 21 is mounted on the top side in a frame 20. In the closed state, the image side 22 of the monitor 21 faces toward the bearing 13. On its back side, the monitor 21 is held by means of a housing 23, which surrounds the frame 20 and has a covering 24, formed like the covering 18.

Figure 3:
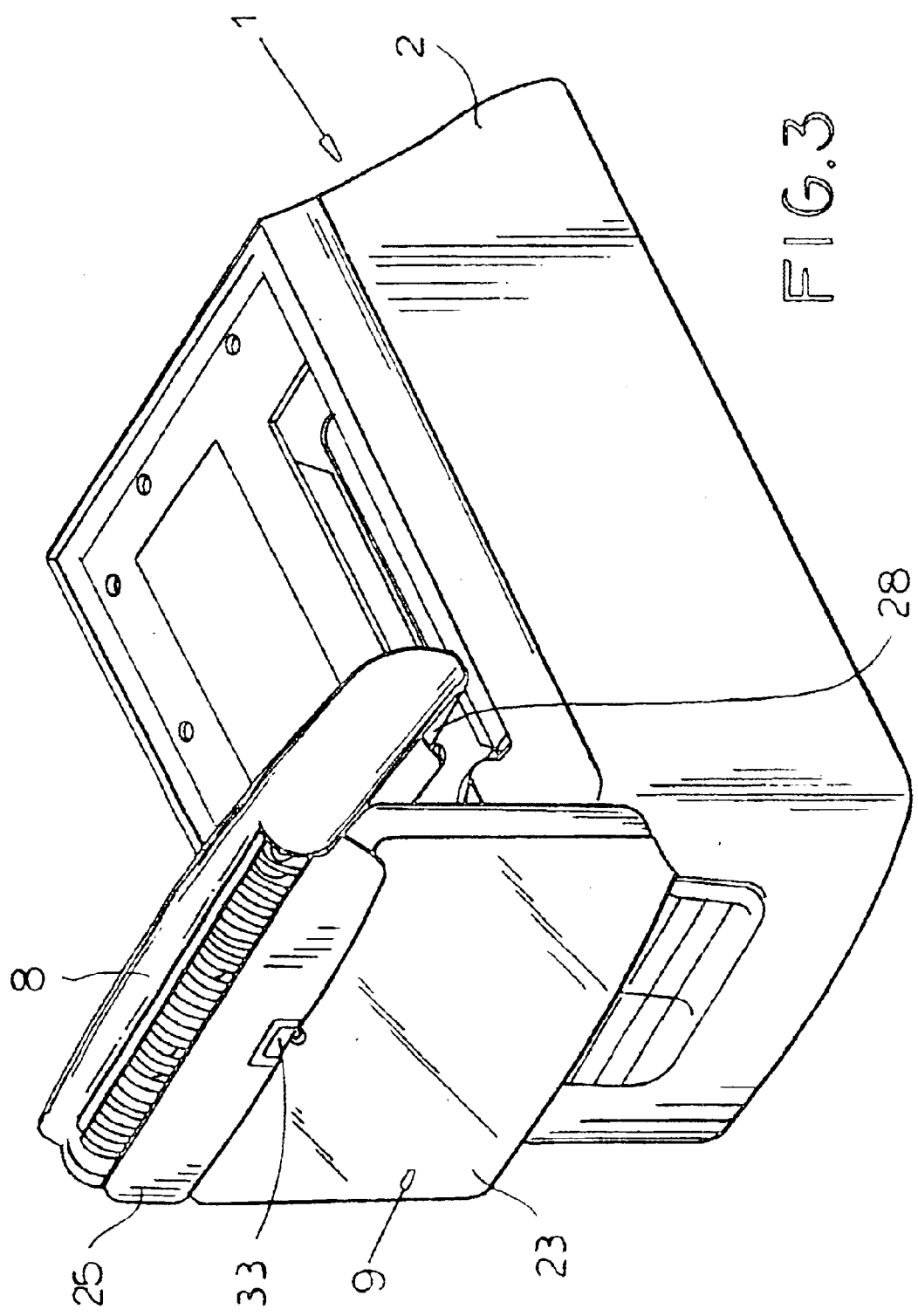
FIG. 3 shows a perspective view of the cover in the folded-together state with the display screen in the folded state from above.
Figure 4:
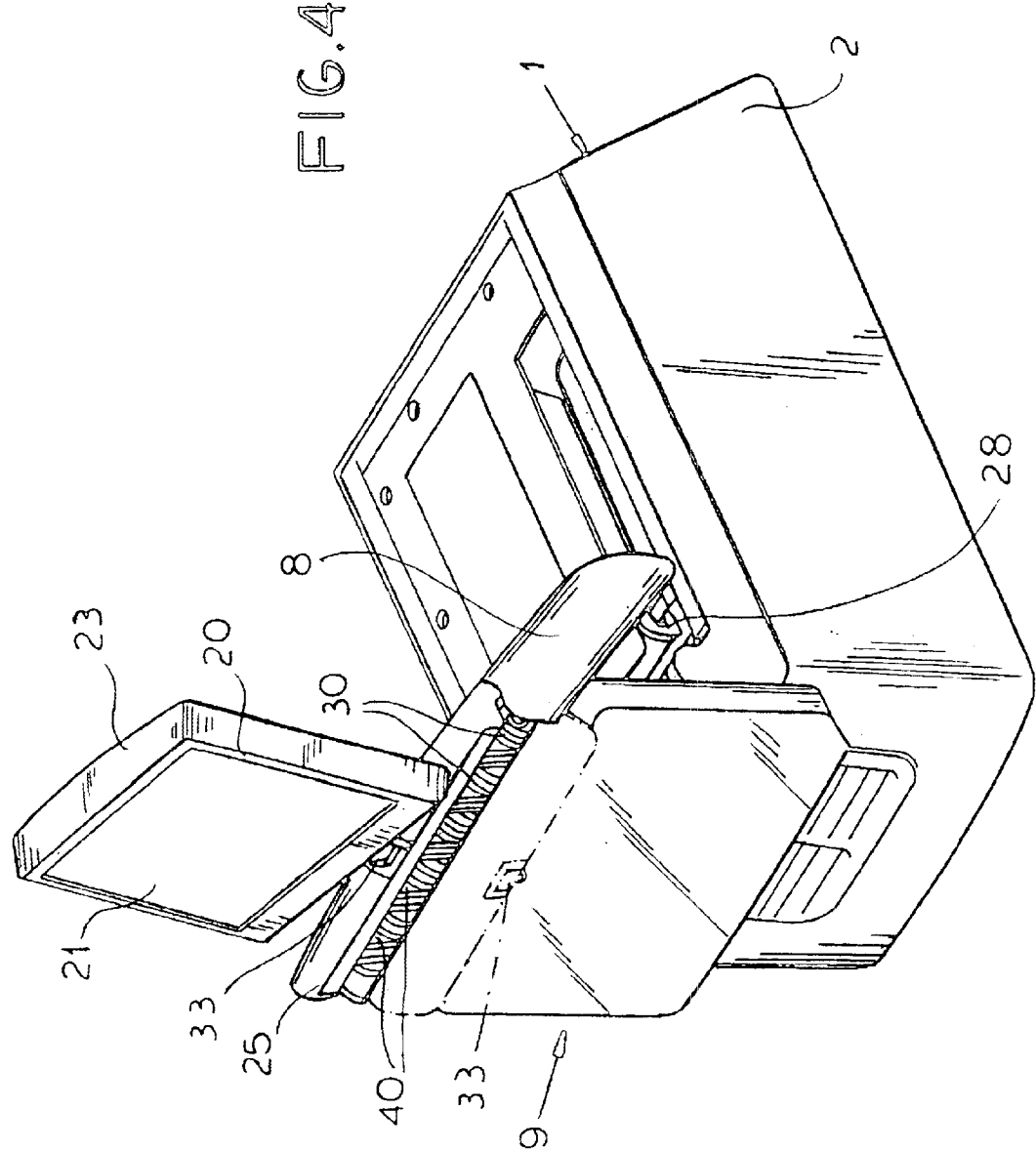
FIG. 4 shows a perspective view of the cover in the folded-together state with the display screen in the open state.

In addition to the bearing part 11 including the monitor 21, the cover part 9 includes an intermediate part 25, which is connected, like the bearing part 11, via at least one mounting link, preferably, via multiple mounting links 40 (FIG. 3, 4) with the pivot shaft, via which the cover part 8 is pivotably connected to the cover part 9.

The cover part 8 has a hinge shaft 27 or a hinge pin on its front end, which are rotatably supported in a carriage 28. The carriage 28 has lateral projections (not shown), which engage in corresponding contours on the bearing 2, such that the front end of the cover part 8 is glidingly guided in the bearing 2.

With the assistance of the carriage 28 (FIG. 2), it is possible to close or "fold" the cover 5. In this manner, the cover part 8 achieves simultaneously a shifting movement and a pivoting movement about the hinge pin or the penetrating hinge shaft 17 upwardly. Thus, the cover part 9 is pivoted about the swivel joint 3 as well as about the pivot shaft 26 upwardly, until the carriage 28 is pressed against a stop 29. The stop 29, for example, is formed as a heart-shaped curve, so that the carriage 28 travels back by means of new pressures against the actuation surface 19 again in its starting position, until the cover 5 covers the bearing 1 again in its flat position.

Figure 2:
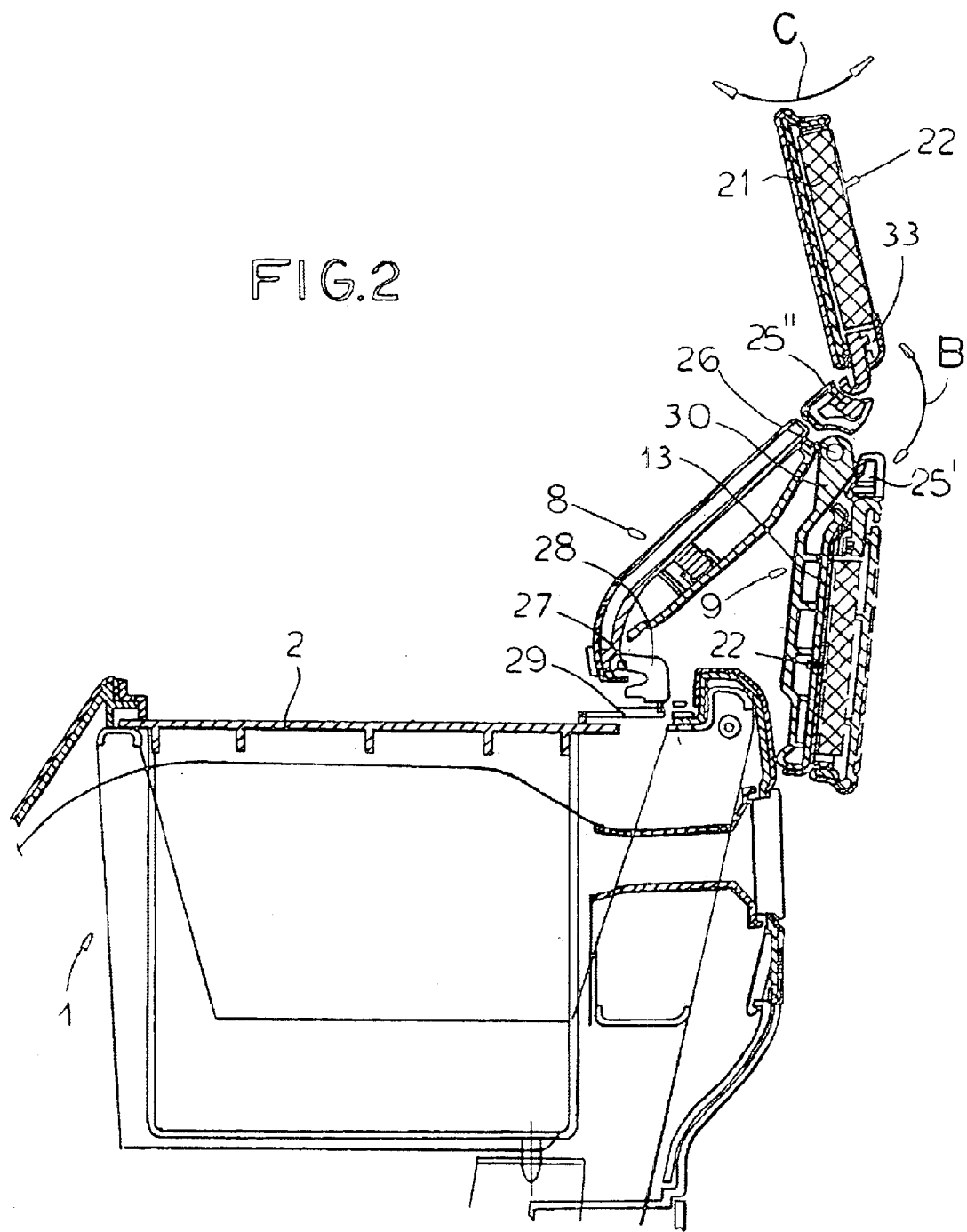
FIG. 2 shows a longitudinal section of the bearing according to FIG. 1 with the cover in the folded-together state and with the display screen in the opened state.

In addition to the mounting link or links 40, the intermediate part 25 also engages mounting links 30 belonging to the cover part 9 on the pivot shaft 26. In this manner, the intermediate part 26 is moveable independently from the cover part 8. Together with the intermediate part 25, also the monitor 21 is moveable, so that it is pivoted, as shown in FIG. 2, from its position 25', in which it is positioned with its image side 22 in the direction of the bearing 13 into a position 25" upwardly in the direction of a double arrow B. In the position 25", the image surface 22 of the monitor 21 lies free, so that representations can be displayed on the image surface 22.

In addition, for pivotability about the pivot shaft 26, the display screen 21 also is rotatable the swivel joint 33, so that a rotation in the direction of a double arrow C is achieved. In this manner, the position of the display screen 21 can be adapted as desired to the seating position and the eye height of the respective observers to a back seat of the passenger vehicle or to one of the front seats.

On the side of the display screen 21, additionally, a control unit is mounted, which can be attached approximately to the frame 20. In order to achieve a movability of the cover 5 with a high degree of comfort, an arced toothing on the hinge arm (not shown) cooperates with a silicon brake 32. Through the invention, therefore, a cover that is adjustable and pivotable on all sides is produced. Instead of an embodiment with the pivot shaft 26 folding together with the pivot axis of the data output and/or data input unit, in an alternative embodiment, it is provided also that the pivot shaft is integrated in the intermediate piece 25 or at another position of the cover part 9, whereby, then, additionally a further swivel joint, like the swivel joint 33, is provided, in order to move the data output and/or data input unit in a further plane. The swivel joint 33 can be embodied also as a ball-and-socket joint.

I claim:

1. A cover supported on a bearing for a center arm rest of a motor vehicle, wherein the cover includes at least a first cover part with which a data unit is moveably connected, the first cover part being pivotally supported relative to the bearing by means of a first pivot shaft a second cover part which is joined at a first end to the first cover part by means of a second pivot shaft and can be folded away together with the first cover part at least until formation of an acute angle between the first and the second cover parts.

2. The cover defined in claim 1 wherein the data unit is connected with the first cover part or with the second cover part by means of the second pivot shaft.

3. The cover defined in claim 2 wherein the data unit is movable by means of a swivel joint in a common pivoting plane as the first or the second cover part.

4. The cover defined in claim 2 wherein the data unit is movable by means of a swivel joint in a different pivoting plane from the first or the second cover part.

5. The cover defined in claim 1 wherein that the first cover part includes an intermediate piece which is pivotably disposed about the second pivot shaft.

6. The cover defined in claim 5 wherein the data unit is connected with the intermediate piece.

7. The cover defined in claim 6 wherein the data unit is connected with the intermediate piece by means of a swivel joint.

8. The cover defined in claim 1 wherein the data unit includes a display.

9. The cover defined in claim 1 wherein the data unit faces toward a bearing of the first cover part in the folded together state with a side having a display or with a side having control elements.

* * * * *